March 19, 1968     F. J. FUCHS, JR     3,373,480

METHODS FOR SHAPING HONEYCOMB STRUCTURES

Filed Dec. 8, 1965

INVENTOR
F. J. FUCHS, JR.
BY *R. P. Miller*
ATTORNEY

United States Patent Office 3,373,480
Patented Mar. 19, 1968

3,373,480
METHODS FOR SHAPING HONEYCOMB STRUCTURES
Francis J. Fuchs, Jr., Princeton Junction, N.J., assignor to Western Electric Company, Incorporated, New York, N.Y., a corporation of New York
Filed Dec. 8, 1965, Ser. No. 512,301
5 Claims. (Cl. 29—421)

This invention relates to methods for shaping honeycomb structures, and more particularly to methods utilizing hydraulic forces to shape honeycomb structures with minimum impartations of detrimental stress configurations.

A honeycomb structure consists of a sandwich arrangement of a pair of plates between which is interposed a cellular frame or core. The cellular frame may comprise a series of intersecting straight slats to form square, rectangular, rhombic or other polygon shaped cells or the slats may be of an undulating shape. The plates and core may be constructed of steel, titanium, or other metals and may also be constructed of plastic, fibrous, or other paperlike materials. The core may be attached to one or both of the plates by welding, adhesive bonding, or even by mechanical interlocks.

These honeycomb structures find utility in a number of industrial applications where it is necessary to provide a light weight structure with high strength. Examples of such industrial utility may reside in the construction of aircraft and also in the construction of molds. However, the utility of these honeycomb structures have been limited because of the difficulty in shaping the basic planar structure into a curvilinear structure. In the shaping of the curvilinear structure, detrimental stress concentrations have been encountered in the shaped sandwich. Further, the structures often fail and separate or break during subjection to the high pressures required for the shaping operation.

An object of this invention resides in a new and improved method of shaping honeycomb structures.

Another object of this invention resides in hydraulically shaping honeycomb structures without setting up detrimental stress concentrations.

A further object of the invention is the provision of a method wherein holes are initially formed in the honeycomb structure to admit pressurized fluid into the cellular core during a subsequent shaping operation.

With these and other objects in view, the present invention contemplates a method wherein holes are first bored in one plate of a planar honeycomb sandwich to communicate with the core cells, and then the sandwich is placed in a die cavity and subjected to hydraulic forming pressures to shape the entire sandwich into a compound curved shape.

Other objects in the present invention will become apparent upon consideration of the following detailed description in conjunction with the accompanying drawings, wherein.

Figure 1:
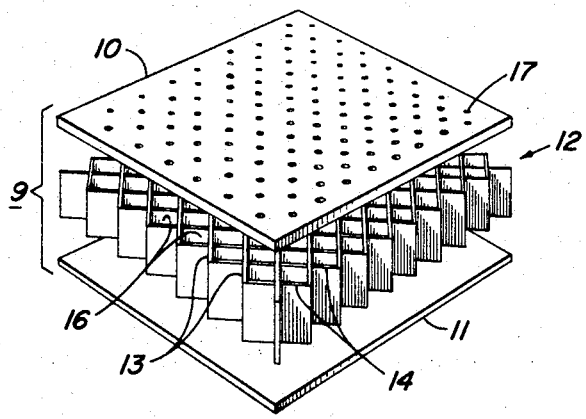
FIG. 1 is an exploded perspective view of a honeycomb structure that may be shaped by methods embodying the principles of the present invention.

Referring first to FIG. 1, there is shown an exploded perspective view of a honeycomb structure 9 comprising a top plate 10 and a bottom plate 11 between which is sandwiched a cellular core 12. The core structure is in the general configuration of a honeycomb; that is, it consists of intersecting slats 13 and 14 joined or bonded together to form square shaped cells 16. The slats 13 and 14 are shown as being straight, but it is to be understood that undulating slats could also be utilized. In addition, slats 13 and 14 may be positioned to form other than square shaped cells, for instance, the cells may be rectangular, rhombic, or other polygon configurations. The plate 11 is attached to the core 12 by welding or adhesive bonding. In addition, the plate 10 is also secured to the core 12.

In practice of the method, the planar plate 10 is provided with a number of apertures 17 communicating from the top surface of the plate into each cell 16. These apertures 17 may be drilled, molded in the plate during the initial fabrication, or otherwise formed prior to or after the securing of the plate 10 to the core 12.

Figure 2:
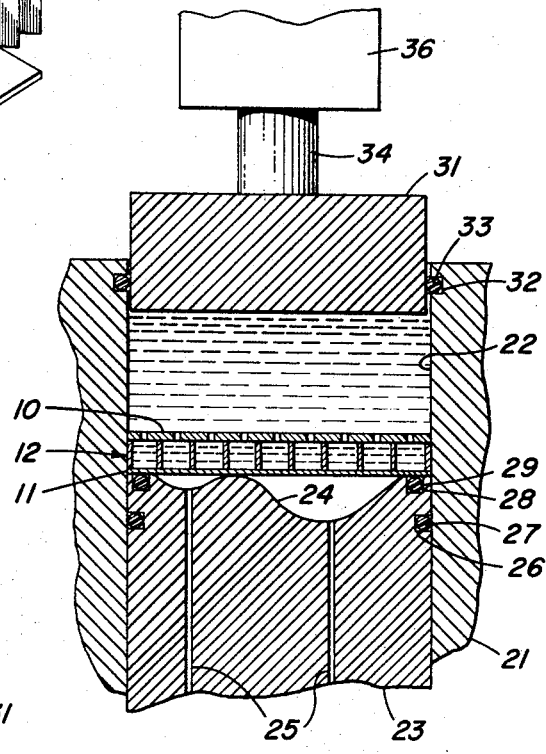
FIG. 2 is an illustration of a forming press for shaping the honeycomb structure against a contoured die surface.

In order to shape the sandwich structure 9, a forming press, such as shown in FIG. 2, may be utilized. This forming press includes a base block 21 having a forming cavity 22 into which extends a die block 23. The die block 23 has a compound curvilinear surface 24 of a configuration to which it is desired to shape the sandwich structure 9. The die block 23 is also provided with a number of bleeder passageways 25 extending to the low portions of the curved die surface 24. A peripheral slot 26 is formed around the die block 23 to receive a seal 27. The die block 23 is also provided with a circumferential recess 28 to receive a further seal 29 that bears against the lower surface of the plate 11.

A ram 31 is positioned to move within the die cavity 22 to exert forces against a fluid contained within the cavity 22. A slot 32 is formed in the upper portion of the base block 21 to receive a seal 33 which cooperates with the ram 31 to confine the fluid within the cavity 22. Attached to the ram 31 is a piston 34 slidably extending into a hydraulic cylinder 36.

In practice of the method, the core structure 12 is fabricated and positioned between the plates 10 and 11. The plate 11 is secured to the core structure 12 and the plate 10 may or may not be secured to the core structure at this time. The plate 10 is drilled to provide passageways 17 communicating with each of the cells 16. Next, the sandwich structure 9 is placed in the die cavity 22 with the non-drilled plate 11 resting on the high portions of the curved surface 24 and the seal 29. Hydraulic fluid is then admitted to the die cavity 22. The ram 31 is next advanced by the piston 34 and cylinder 36 into the die cavity 22 to pressurize the fluid. The pressurized fluid readily passes through the apertures 17 to act against the lower plate 11 to shape this plate and the attached core structure 12 into the configuration of the surface 24. The pressurized fluid acts against the upper surface of the bottom plate 11 except for that portion of the plate contacted by the core slats 13 and 14.

Figure 3:
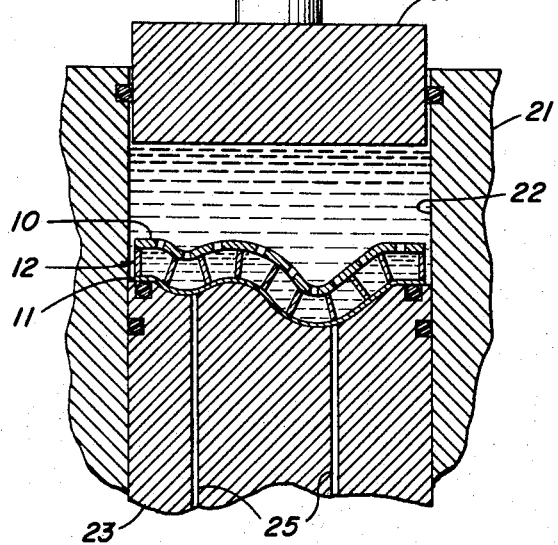
FIG. 3 is an illustration of the forming press after the honeycomb structure has been shaped by application of hydraulic pressures.

At this time, the pressure on both sides of the top plate 10 is the same except for the area of the plate contacted by the upper ends of the core slats 13 and 14. In this contacted area, there is a differential pressure exerted on the top plate 10 which acts to force this plate down to impart a downward force through the core slats 13 and 14 against the lower plate. It may be thus appreciated that there are pressures acting on both the lower plate 11 and the upper plate 10 which cooperate to shape both of these plates in accordance with the contoured surface 24. Any fluid that is trapped below the plate 11 is exited through the bleeder passageways 25. As the forming operation takes place, the lateral pressures in the fluid within the sandwich structure are maintained constant, thus precluding the impartation of detrimental bending stresses to the slats 13 and 14. The resultant curvilinear sandwich structure is illustrated in FIG. 3.

The plate 11 may be constructed of a relatively thin sheet of titanium whereas the plate 10 may be constructed of a thicker sheet of another metal such as steel or copper. If the resulting sandwich structure is used as an element in a molding die, then heating or cooling fluid may be admitted through the apertures 17 to heat or cool the sandwich die structure as the molding requirements dictate. In addition, either heat conducting material or insulating material may be forced through the hole 17 to alter the thermocharacteristics of the resultant shaped sandwich structure.

It has to be understood that the above-described selection of materials and sequence of steps are simply illustrative of an application of the principles of the inventive material and many other modifications may be made without departing from the invention.

What is claimed is:

1. A method of shaping a multicelled, honeycomb laminate wherein the honeycomb laminate comprises a first surface and a second surface, said second surface being perforated to the individual cells thereof, which comprises:
   placing said first surface of the laminate against a die surface, and
   applying pressurized forming fluid to said second perforated surface of the laminate and through the perforations in said second perforated surface to the interior of the cells thereof to conform said first surface of the laminate to the die surface.

2. A method of fabricating a curvilinear honeycomb sandwich from a planar honeycomb sandwich wherein the honeycomb sandwich comprises a pair of spaced planar plates secured to an interposed multicellular structure which method comprises,
   forming holes extending through a first of said plates to individual cells of said structure,
   placing the second plate of said honeycomb sandwich against a die having a curvilinear surface, and then
   applying pressurized fluid against said first plate and flowing said fluid through said holes against said second plate to deform said second plate against said curvilinear surface.

3. A method of shaping a honeycomb sandwich comprising a series of intersecting slats defining an array of cells and top and bottom planar plates secured to the top and bottom edges of said slats to enclose said cells, which comprises the steps of
   drilling holes through the top plate to open into each of said cells,
   placing the sandwich structure into a forming die cavity with the bottom plate abutting a non-planar die surface, and then
   applying pressurized fluid to said die cavity to force said fluid through said holes to act against the lower plate and deform said lower plate against said die surface.

4. A method of fabricating multicurved honeycomb structure which comprises,
   securing a first flat plate of a predetermined thickness to a flat top surface of a frame having a plurality of non-interconnected open cells extending from a top planar surface to a flat bottom planar surface,
   securing a second flat plate of a thickness less than said predetermined thickness to said bottom surface to complete a honeycomb structure,
   drilling holes through said first plate to individually extend into each of said cells,
   abutting said second flat plate against a non-planar surface of a forming cavity formed within a die, and then
   applying fluid with sufficient pressure to said die cavity to force the fluid through said holes to act against said second plate and frame to deform said honeycomb structure against said non-planar surface.

5. A method of fabricating a multicurved honeycomb structure as set forth in claim 3 wherein,
   drilling of the holes is effected prior to the securing of the first plate to the flat top surface of the frame.

References Cited

UNITED STATES PATENTS

| | | | |
|---|---|---|---|
| 3,060,561 | 10/1962 | Watter | 29—455 |
| 3,071,853 | 1/1963 | Price et al. | 29—471.1 |
| 3,196,533 | 7/1965 | Ida et al. | 29—455 |
| 2,726,973 | 12/1955 | Corral | 72—60 X |

CHARLIE T. MOON, *Primary Examiner.*